(12) United States Patent
Chen

(10) Patent No.: US 7,556,461 B2
(45) Date of Patent: Jul. 7, 2009

(54) THERMAL EXPANSION KNIFE ADAPTER

(76) Inventor: Chin-Chiu Chen, No. 198, Jingpu Rd., Cingshuei Chen, Taichung Hsien (TW)

( * ) Notice: Subject to any disclaimer, the term of this patent is extended or adjusted under 35 U.S.C. 154(b) by 266 days.

(21) Appl. No.: 11/799,157

(22) Filed: May 1, 2007

(65) Prior Publication Data

US 2008/0274866 A1  Nov. 6, 2008

(51) Int. Cl.
*B23C 5/00* (2006.01)
(52) U.S. Cl. .................... 409/234; 29/447; 279/102
(58) Field of Classification Search ........... 409/234, 409/232; 279/102–103; 29/447; 408/239 A, 408/239 R, 238; 403/28–30, 273
See application file for complete search history.

(56) References Cited

U.S. PATENT DOCUMENTS

| | | | | |
|---|---|---|---|---|
| 5,311,654 A | * | 5/1994 | Cook | ............ 29/447 |
| 6,260,858 B1 | * | 7/2001 | DeLucia | ............ 279/102 |
| 6,315,506 B1 | * | 11/2001 | Mizoguchi | ............ 409/234 |
| 6,595,528 B2 | * | 7/2003 | Voss | ............ 279/102 |
| 7,137,185 B2 | * | 11/2006 | Voss et al. | ............ 29/447 |

FOREIGN PATENT DOCUMENTS

| EP | 1084782 A1 | * | 3/2001 |
|---|---|---|---|
| JP | 2002-120115 A | * | 4/2002 |
| JP | 2002-283162 A | * | 10/2002 |

* cited by examiner

*Primary Examiner*—Erica E Cadugan
(74) *Attorney, Agent, or Firm*—William E. Palton, Esq.; Cooper & Dunham LLP

(57) ABSTRACT

A thermal expansion knife adapter has a body, a conical shaft connecting sleeve and a conical knife connecting sleeve. The body has a first side and a second side. The conical shaft connecting sleeve is formed on and extends from the first side of the body and has a shaft holding hole defined in the shaft connecting sleeve at an end opposite to the body. The conical knife connecting sleeve is formed on and extends from the second side of the body and has a knife holding hole defined in the knife connecting sleeve at an end opposite to the body and communicating with the shaft holding hole in the shaft connecting sleeve. The knife connecting sleeve is a separate element securely and integrally combined with the body. The material for forming the body and the shaft connecting sleeve is different from that for forming the knife connecting sleeve.

2 Claims, 4 Drawing Sheets

THERMAL EXPANSION KNIFE ADAPTER

BACKGROUND OF THE INVENTION

1. Field of the Invention

The present invention relates to a knife adapter, and more particularly to a thermal expansion knife adapter with a lowered manufacturing cost.

2. Description of Related Art

With reference to FIGS. 3 and 4, a conventional thermal expansion knife adapter comprises a discal body (30), a shaft connecting sleeve (31) and a knife connecting sleeve (32). The shaft connecting sleeve (31) is conical and is formed on and extends from one side of the body (30). The shaft connecting sleeve (31) has a shaft holding hole defined in the shaft connecting sleeve (31) at an end opposite to the body (30) and is connected to a shaft to make the knife adapter rotating with the shaft. The knife connecting sleeve (32) is conical and is formed on and extends from the other side of the body (30). The knife connecting sleeve (32) has a knife holding hole (33) defined in the knife connecting sleeve (32) at an end opposite to the body (30) and communicating with the shaft holding hole in the shaft connecting sleeve (31).

In use, a knife is inserted into the knife holding hole (33) in the knife connecting sleeve (32), and the knife adapter is heated. With the thermal expansion of the knife connecting sleeve (32), the knife is securely held in the knife holding hole (33) and is rotated with the knife adapter for cutting or turning a working piece. However, to attach and detach different knifes to the knife adapter for different working conditions, the knife adapter has to be heated repeatedly and is always made of an alloy material with a high thermal expansion efficiency, such as alloy steel for hot-forging dies. Therefore, the cost for manufacturing the conventional knife adapter is expensive and high.

To overcome the shortcomings, the present invention tends to provide a knife adapter to mitigate or obviate the aforementioned problems.

SUMMARY OF THE INVENTION

The main objective of the invention is to provide a thermal expansion knife adapter with a lowered manufacturing cost. The thermal expansion knife adapter has a body, a conical shaft connecting sleeve and a conical knife connecting sleeve. The body has a first side and a second side. The conical shaft connecting sleeve is formed on and extends from the first side of the body and has a shaft holding hole defined in the shaft connecting sleeve at an end opposite to the body. The conical knife connecting sleeve is formed on and extends from the second side of the body and has a knife holding hole defined in the knife connecting sleeve at an end opposite to the body and communicating with the shaft holding hole in the shaft connecting sleeve. The knife connecting sleeve is a separate element securely and integrally combined with the body. The material for forming the body and the shaft connecting sleeve is different from that for forming the knife connecting sleeve.

Other objects, advantages and novel features of the invention will become more apparent from the following detailed description when taken in conjunction with the accompanying drawings.

DETAILED DESCRIPTION OF PREFERRED EMBODIMENT

Figure 1:
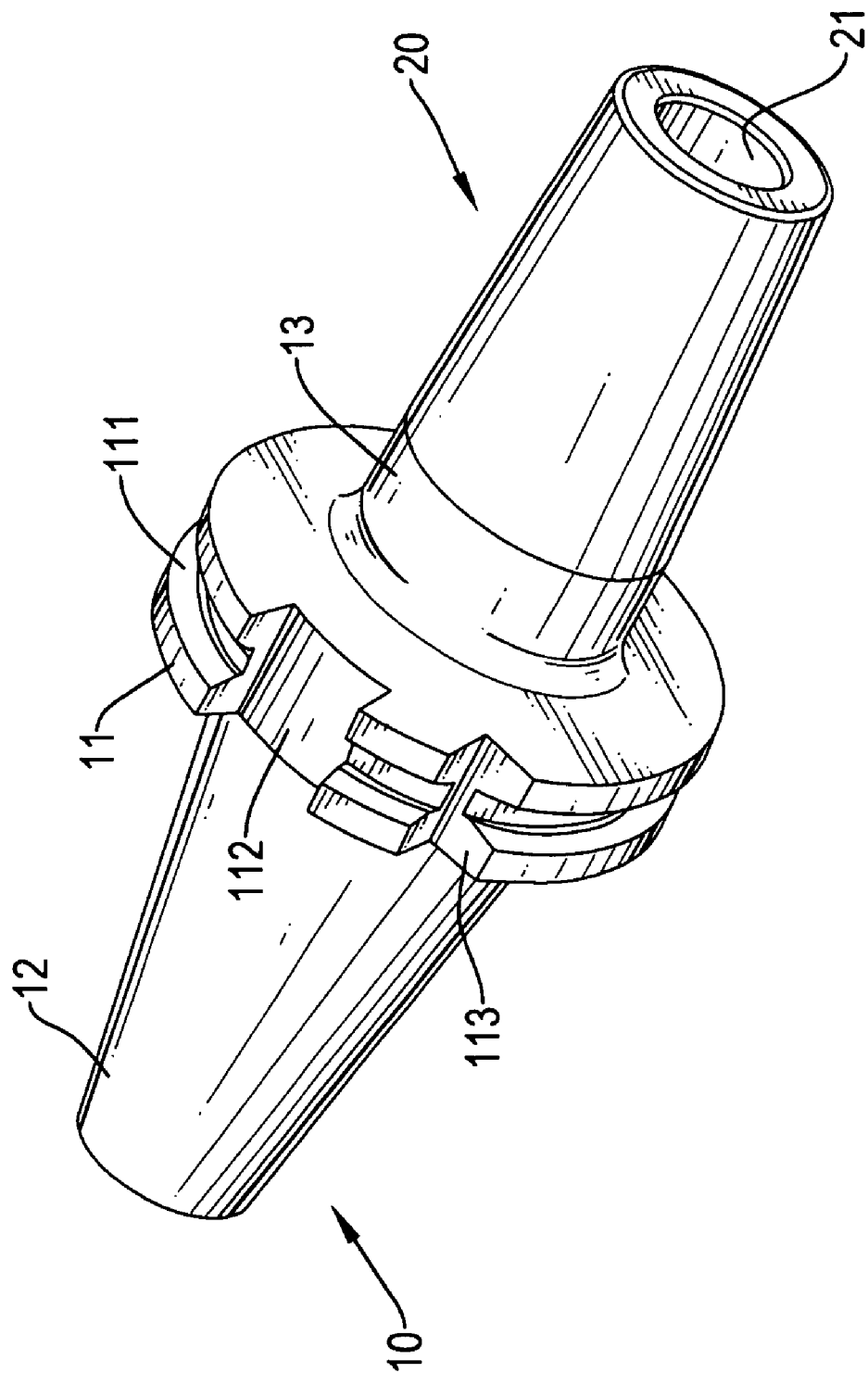
FIG. 1 is a perspective view of a knife adapter in accordance with the present invention.
Figure 2:
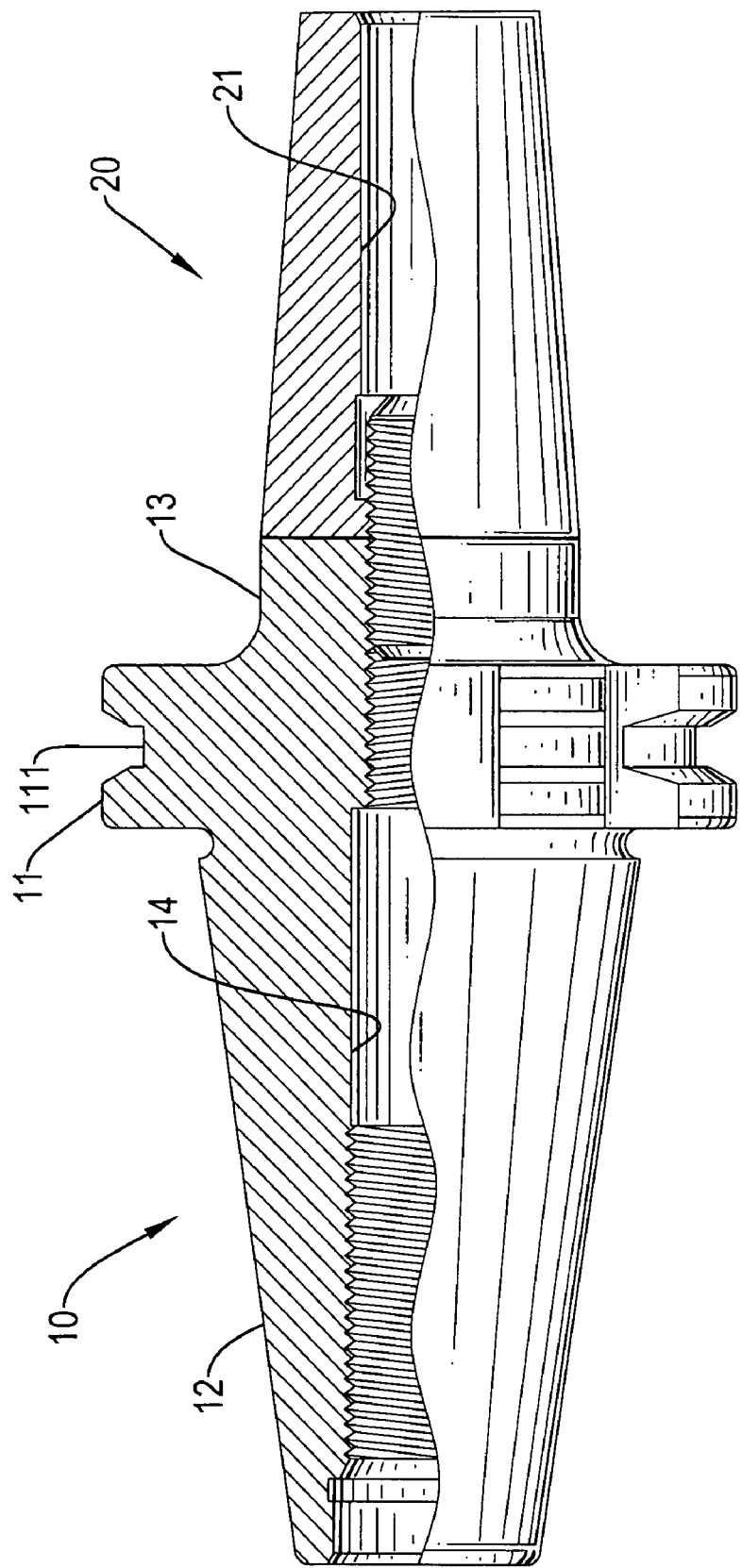
FIG. 2 is a side view in partial section of the knife adapter in FIG. 1.
Figure 3:
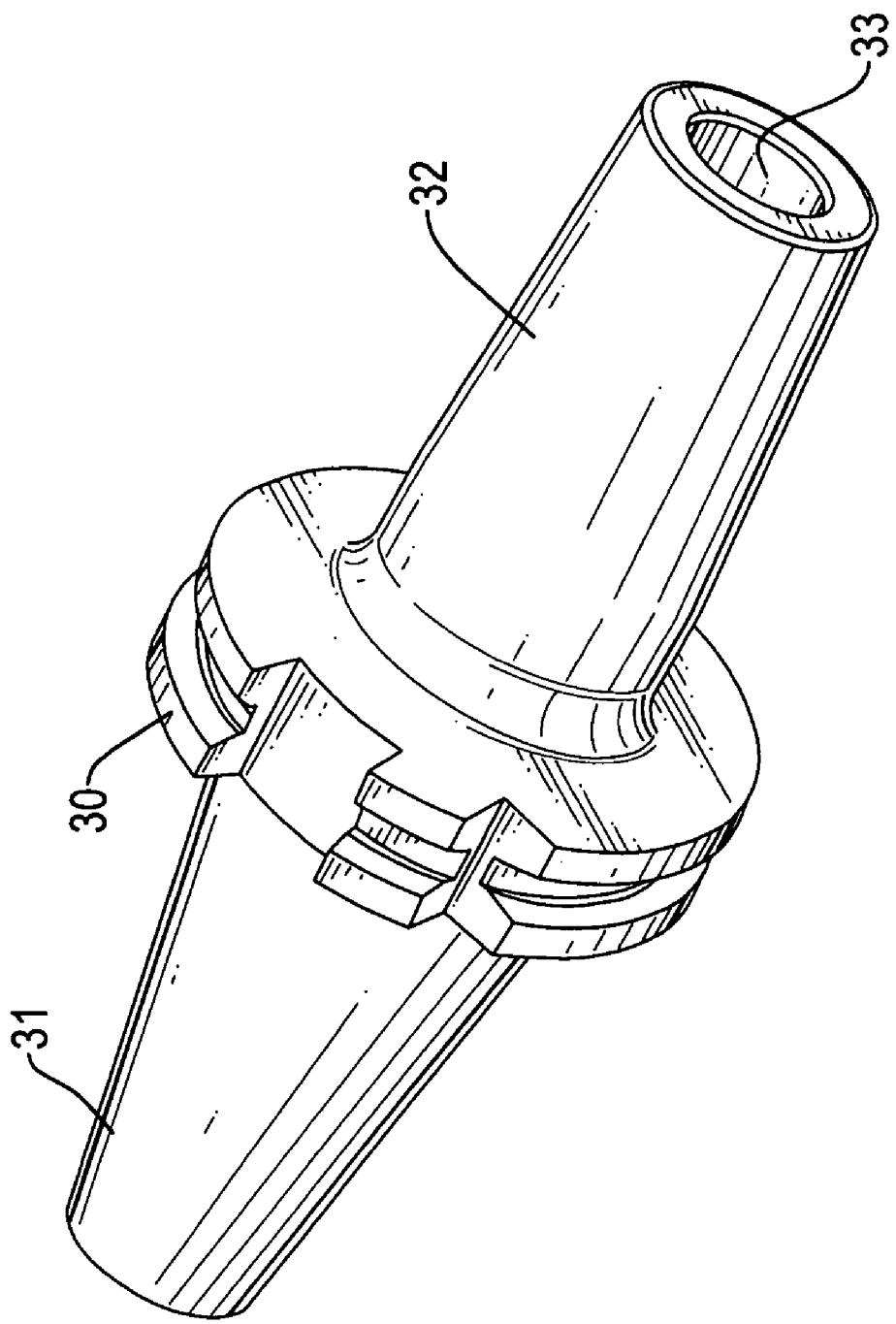
FIG. 3 is a perspective view of a conventional knife adapter in accordance with the prior art.
Figure 4:
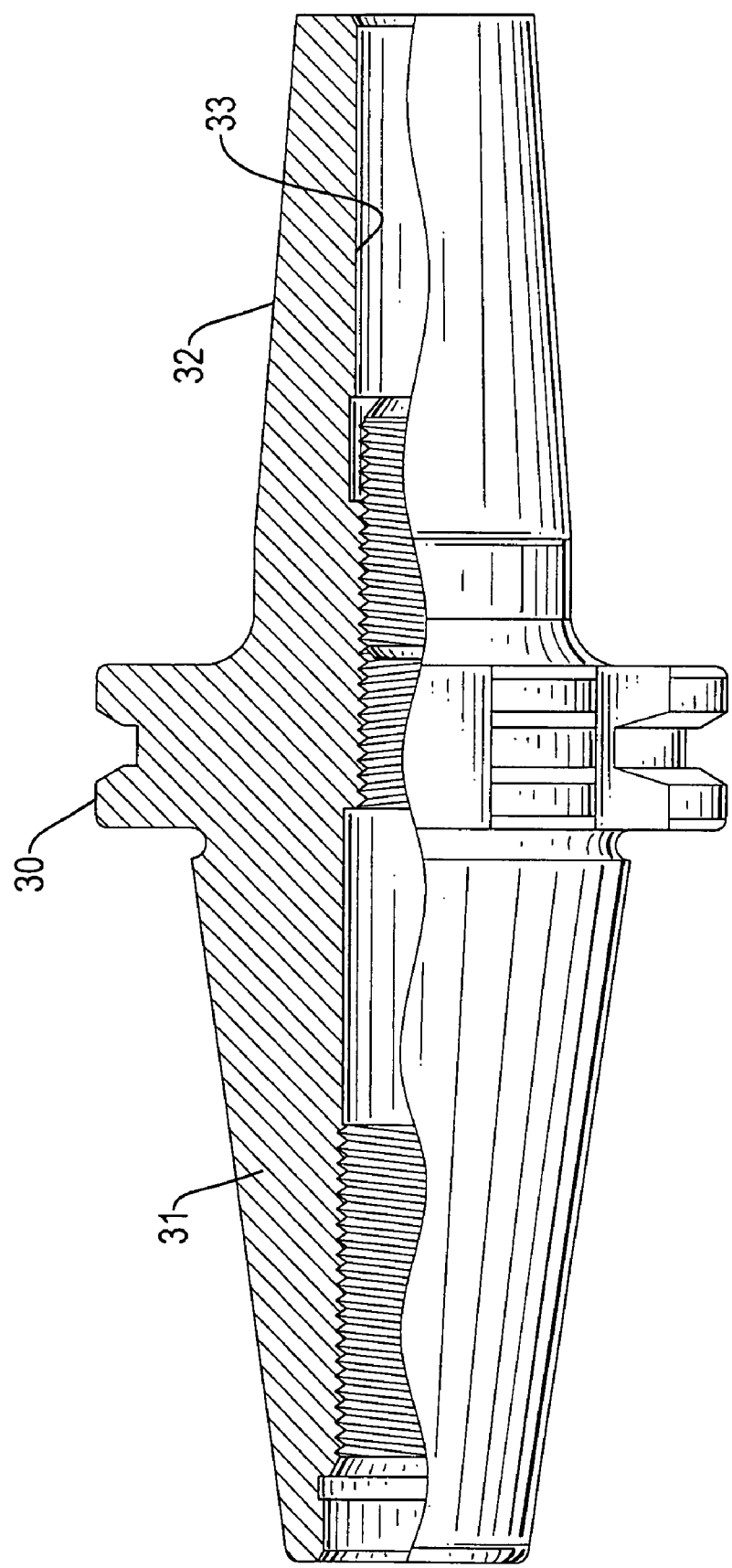
FIG. 4 is a side view in partial section of the conventional knife adapter in FIG. 3.

With reference to FIGS. 1 and 2, a thermal expansion knife adapter (10) comprises a body (11), a shaft connecting sleeve (12) and a knife connecting sleeve (20). The body (11) is discal and has a first side, a second side, an outer periphery, an annular groove (111), a positioning notch (112) and a V-shaped notch (113). The annular groove (111) is defined around the outer periphery of the body (11) and has a V-shaped cross section. The positioning notch (112) is radially defined in the outer periphery of the body (11) and communicates with the annular groove (111). The V-shaped notch (113) is defined radially in the outer periphery of the body (11), communicates with the annular groove (111) and is separate from the positioning notch (112). Additionally, the body (11) further has a tubular sleeve mount (13) formed on and extending from the second side of the body (11).

The shaft connecting sleeve (12) is conical and is formed on and extends from the first side of the body (11). The shaft connecting sleeve (12) has a shaft holding hole (14) defined in the shaft connecting sleeve (12) at an end opposite to the body (11).

The knife connecting sleeve (20) is conical and is formed on and extends from the second side of the body (11), preferably, the knife connecting sleeve (20) is securely connected with the sleeve mount (13) on the body (11). The knife connecting sleeve (20) has a knife holding hole (21) defined in the knife connecting sleeve (20) at an end opposite to the body (11) and communicating with the shaft holding hole (14) in the shaft connecting sleeve (12). The knife connecting sleeve (20) is a separate element securely and integrally combined with the sleeve mount (13) of the body (11) with a welding process. The material for forming the body and the shaft connecting sleeve (12) is different from that for forming the knife connecting sleeve (20). Preferably, the knife connecting sleeve (20) is made of an alloy material with a high thermal expansion efficiency, such as alloy steel for hot-forging dies. The body (11) and the shaft connecting sleeve (12) may be made of chromium molybdenum alloy steel or nickel chromium molybdenum alloy steel. Because the cost of material for the body (11) and the shaft connecting sleeve (12) is cheaper than that for the knife connecting sleeve (20), the cost for manufacturing the whole knife adapter (10) is reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A thermal expansion knife adapter comprising:
   a body having a first side and a second side and a tubular sleeve mount formed on and extending from the second side of the body, the sleeve mount terminating at an end face at an end opposite to the body;

a conical shaft connecting sleeve formed on and extending from the first side of the body and having a shaft holding hole defined in the shaft connecting sleeve at an end opposite to the body; and a conical knife connecting sleeve formed on and extending from the second side of the body and having a knife holding hole defined in the knife connecting sleeve at an end opposite to the body and communicating with the shaft holding hole in the shaft connecting sleeve, wherein the knife connecting sleeve is a separate element securely and integrally combined with the body such that the end face of the sleeve mount is in abutment with a terminal end face of the knife connecting sleeve; and a material for forming the body and the shaft connecting sleeve is different from that for forming the knife connecting sleeve.

2. The thermal expansion knife adapter as claimed in claim 1, wherein the body is discal and the tubular sleeve mount is securely connected with the knife connecting sleeve.

* * * * *